United States Patent
Sheu et al.

(10) Patent No.: US 9,397,528 B2
(45) Date of Patent: Jul. 19, 2016

(54) SHAFT LINEAR MOTOR WITH IMPROVED STRUCTURAL STRENGTH

(71) Applicant: DELTA ELECTRONICS, INC., Taoyuan Hsien (TW)

(72) Inventors: Hong-Cheng Sheu, Taoyuan Hsien (TW); Chi-Wen Chung, Taoyuan Hsien (TW); Chi-Shin Chuang, Taoyuan Hsien (TW); En-Yi Chu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 453 days.

(21) Appl. No.: 13/920,644

(22) Filed: Jun. 18, 2013

(65) Prior Publication Data
US 2014/0300214 A1    Oct. 9, 2014

(30) Foreign Application Priority Data

Apr. 8, 2013  (TW) .............................. 102112277 A

(51) Int. Cl.
*H02K 41/03*    (2006.01)
*H02K 5/08*    (2006.01)

(52) U.S. Cl.
CPC . *H02K 5/08* (2013.01); *H02K 41/03* (2013.01)

(58) Field of Classification Search
CPC ................................ H02K 41/02; H02K 41/03
USPC .......... 310/12.27, 12.31, 12.32, 12.33, 12.09, 310/12.11, 12.21, 12.23, 14
See application file for complete search history.

(56) References Cited

U.S. PATENT DOCUMENTS

| | | | | |
|---|---|---|---|---|
| 2010/0194210 A1* | 8/2010 | Homma | ................. | H02K 41/03 310/12.01 |
| 2011/0025136 A1* | 2/2011 | Chao | ..................... | H02K 41/03 310/12.02 |

FOREIGN PATENT DOCUMENTS

| | | | | |
|---|---|---|---|---|
| JP | 2006006058 | | 1/2006 | |
| JP | 2006006058 A | * | 1/2006 | ............. H02K 41/03 |

OTHER PUBLICATIONS

Machine translation of JP 2006006058 A (Jan. 2006).*

* cited by examiner

*Primary Examiner* — Michael Andrews
(74) *Attorney, Agent, or Firm* — Hauptman Ham, LLP

(57) ABSTRACT

A shaft linear motor includes an armature portion, a magnetic way and a sealing resin. The armature portion includes a frame, two ribs and a bobbin. The frame is formed with a receiving space therein. The two ribs are disposed on an inner wall of the frame. The ribs are respectively formed with a sectional surface. The bobbin is disposed in the receiving space and formed with an axially penetrated hole. The magnetic way is linearly and movably disposed in the axially penetrated hole. The sealing resin is fully filled in the receiving space for wrapping the inner wall of the frame and the sectional surfaces.

15 Claims, 9 Drawing Sheets

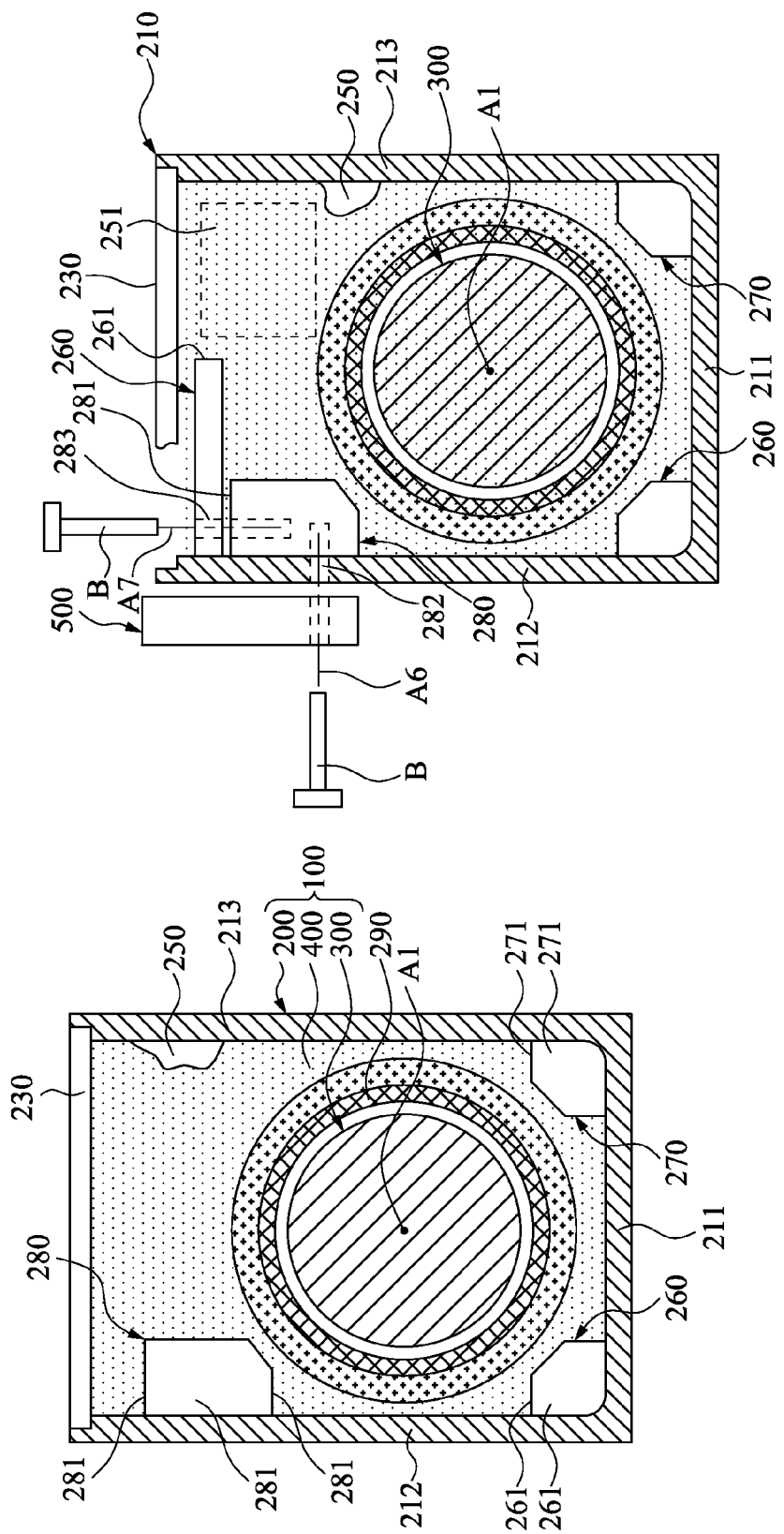

SHAFT LINEAR MOTOR WITH IMPROVED STRUCTURAL STRENGTH

RELATED APPLICATIONS

This application claims priority to Taiwan Application Serial Number 102112277, filed Apr. 8, 2013, which is herein incorporated by reference.

BACKGROUND

1. Field of Disclosure

The disclosure relates to a motor. More particularly, the disclosure relates to a shaft linear motor.

2. Description of Related Art

To precisely control the location of linear movement through motor driving, a means of adopting a ball screw on a servo-motor is often used. However, the requirements to the achievement of the linear movement becomes higher and higher in various applications, such as higher speed, lower noise and higher precision in positioning. In this regard, a shaft linear motor is used nowadays for replacing the conventional mechanical linear movement in the applications.

A conventional shaft linear motor is mainly composed of an armature portion and a magnetic way. The magnetic way axially penetrates the armature portion and performs the reciprocal movement relative to the armature portion. In addition, the armature portion is provided with a sealing resin therein.

Nonetheless, because a frame of the armature portion is limited in thickness, and the inner wall of the frame of the armature portion is not easy to be attached by sealing resin, the sealing resin and the inner wall of the frame of the armature portion suffer limited the binding strength. As a result, the sealing resin is very likely off from the inner wall of the frame of the armature portion and is moving along with the armature portion due to the vibration generated by the reciprocal movement of the magnetic way.

Therefore, it is urgently concerned for a solution that able to solve the mentioned inconvenience and disadvantages without greatly altering the design of the armature par.

SUMMARY

The present disclosure discloses a shaft linear motor for providing a magnetic way and an armature portion smoothly performing reciprocal movement relative to each other.

The present disclosure discloses a shaft linear motor. By increasing sectional surfaces having different heights with respect to the inner wall of a frame of an armature portion for allowing a sealing resin to be filled and wrapped, the binding strength of the sealing resin and the inner wall of the frame of the armature portion can be enhanced, thereby lowering the possibilities of the sealing resin being released from the inner wall of the frame of the armature portion.

According to one embodiment of the present disclosure, the shaft linear motor includes an armature portion, a magnetic way and a sealing resin. The armature portion includes a frame, at least one first rib, at least one second rib and a bobbin. The frame is formed with a receiving space therein. The first rib and the second rib are disposed in the receiving space, and arranged on an inner wall of the frame. The first rib includes at least one first sectional surface, the second rib includes at least one second sectional surface, the first sectional surface and the second sectional surface are respectively adjacent to the inner wall of the frame. The outer wall of the bobbin is reeled with a coil winding set, disposed in the receiving space, and spaced with an interval with respect to the first rib and the second rib. The bobbin is formed with an axially penetrated hole. The magnetic way is linearly and moveably disposed in the axially penetrated hole of the bobbin. The sealing resin is fully filled in the receiving space for wrapping the inner wall of the frame, the coil winding set and the sectional surfaces.

According to one embodiment of the present disclosure, the frame includes a first strip-shaped sheet member, a second strip-shaped sheet member and a third strip-shaped sheet member. The long axial directions of the first strip-shaped sheet member, the second strip-shaped sheet member and the third strip-shaped sheet member are all parallel to an axial direction of the frame. The third strip-shaped sheet member and the second strip-shaped sheet member are disposed adjacent to two opposite long sides of the first strip-shaped sheet member and extended towards the same direction. The first rib is disposed at a junction where the first strip-shaped sheet member connects to the second strip-shaped sheet member, the second rib is disposed at another junction where the first strip-shaped sheet member connects the third strip-shaped sheet member.

According to this embodiment, the armature portion further includes two end covers and an outer cover. The two end covers are oppositely covered on two opposite short sides of the first strip-shaped sheet member, the second strip-shaped sheet member and the third strip-shaped sheet member. Each of the end covers is formed with an opening, and two ends of the bobbin are respectively received in the openings of the two end covers. The outer cover is covered between the second strip-shaped sheet member and the third strip-shaped sheet member. The first strip-shaped sheet member, the second strip-shaped sheet member, the third strip-shaped sheet member, the outer cover and the two end covers jointly define the receiving space.

Based on what has been disclosed above, with the ribs installed in the frame of the shaft linear motor provided by the present disclosure, the binding strength of the sealing resin and the inner wall of the frame of the armature portion can be enhanced, thereby lowering the possibility of the sealing resin being released from the inner wall of the frame of the armature; moreover, the ribs can be formed with more screw passages thereby allowing the shaft linear motor to be provided with more functional components, or be fixed on a fixed carrying member in a much more stable manner thereby allowing to be installed with components having higher performance and the sealing resin to be prevented from being easily released from the inner wall of the frame of the armature portion.

BRIEF DESCRIPTION OF THE DRAWINGS

The present disclosure will be apparent to those skilled in the art by reading the following detailed description of a preferred embodiment thereof, with reference to the attached drawings, in which:

FIG. 9 is a cross sectional view showing the shaft linear motor according the one another embodiment of the present disclosure;

FIG. 10 is a cross sectional view showing the shaft linear motor according to one alternative of the one another embodiment, wherein the crossing location being the same as FIG. 9;

DETAILED DESCRIPTION

The spirit of the disclosure will be described clearly through the drawings and the detailed description as follows. Any of those of ordinary skills in the art can make modifications and variations from the technology taught in the disclosure after understanding the embodiments of the disclosure, without departing from the sprite and scope of the disclosure.

Figure 1A:
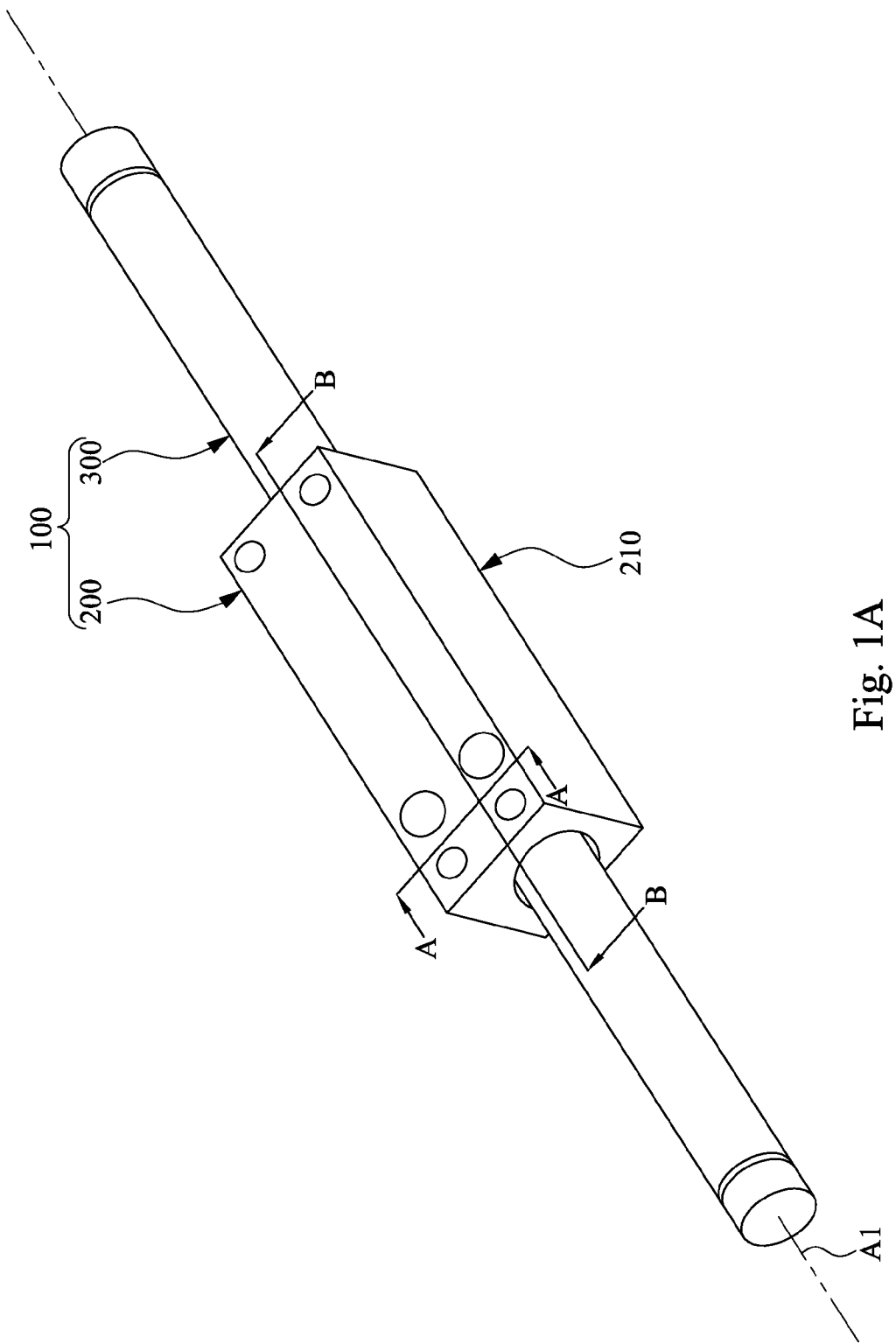
FIG. 1A is a perspective view showing the shaft linear motor according one embodiment of the present disclosure.
Figure 1B:
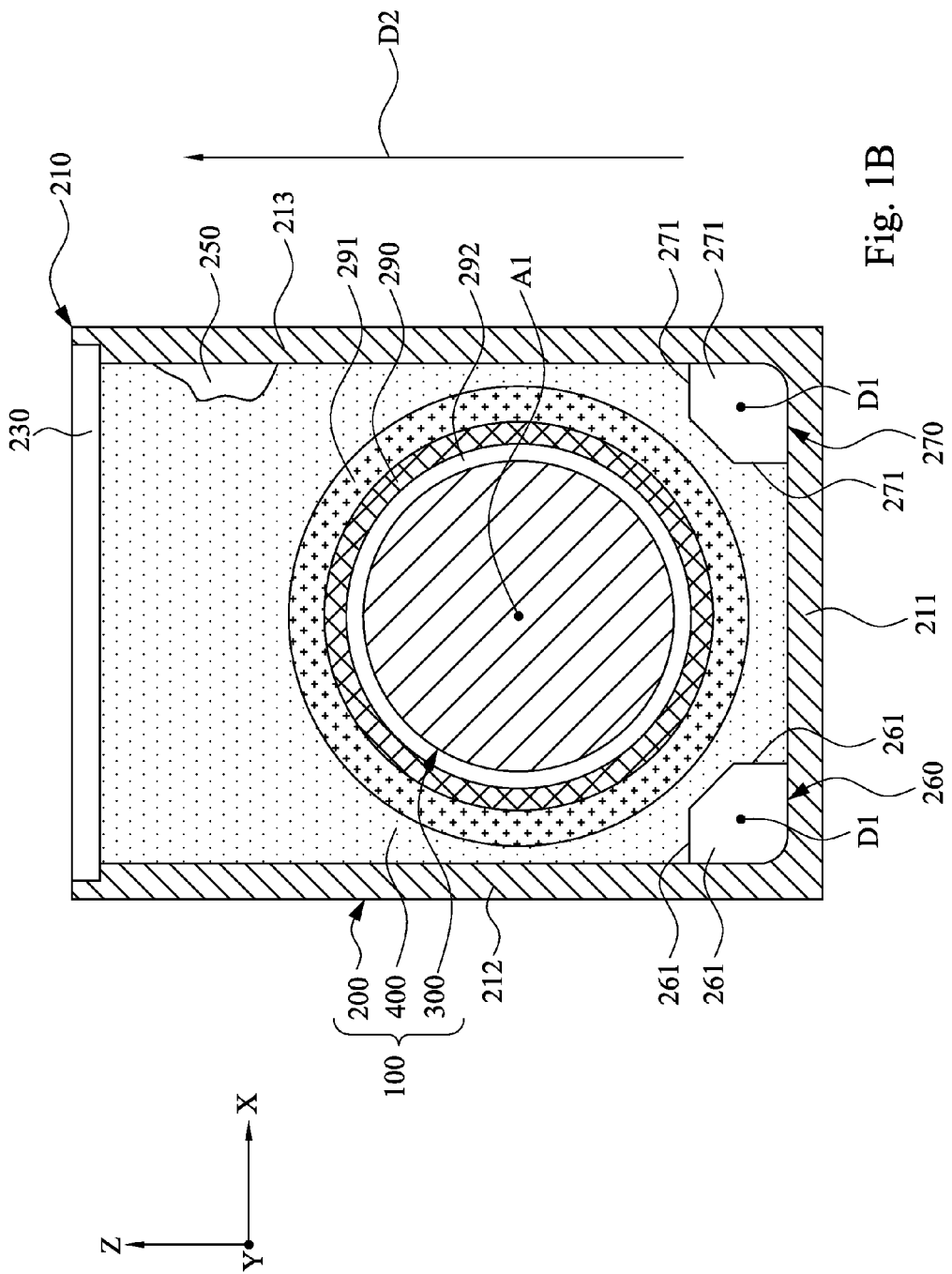
FIG. 1B is a cross sectional view of FIG. 1A taken along line A-A.

Reference is now made to FIG. 1A and FIG. 1B. FIG. 1A is a perspective view showing the shaft linear motor according one embodiment of the present disclosure; and FIG. 1B is a cross sectional view of FIG. 1A taken along line A-A.

As shown in FIG. 1A and FIG. 1B, the shaft linear motor 100 includes an armature portion 200, a magnetic way 300 and a sealing resin 400.

The armature portion 200 includes a frame 210, one or more first ribs 260, one or more second ribs 270 and a bobbin 290. The frame 210 is e.g., formed in a shaft shape or a columnar shape, what shall be addressed is that the present disclosure is not limited to the disclosed arrangement; the frame can be formed in other geometric shapes. The frame 210 is formed with a receiving space 250 therein. The receiving space 250 is extended towards an axial direction A1 of the frame 210. The first rib 260 and the second rib 270 are disposed in the receiving space 250, and arranged on an inner wall of the frame 210, what shall be addressed is that the disposed location is not limited, for example, the first rib 260 and the second rib 270 can be oppositely disposed in the receiving space 250, and symmetrically arranged on the inner wall of the frame 210. The first rib 260 includes one or more first sectional surfaces 261, the second rib 270 includes one or more second sectional surfaces 271, the first sectional surfaces 261 and the second sectional surfaces 271 are adjacently arranged on the inner wall of the frame 210 respectively.

The bobbin 290 is disposed in the receiving space 250, and spaced with an interval with respect to the first rib 260 and the second rib 270. The outer surface of the bobbin 290 is reeled with a coil winding set 291, and the bobbin 290 is formed with an axially penetrated hole 292.

The magnetic way 300 is linearly and movably disposed in the axially penetrated hole 292 of the bobbin 290, used for mutually inducing with the coil winding set 291, and enabled to perform reciprocal movement relative to the armature portion 200. The magnetic way 300, the frame 210, the bobbin 290 and the axially penetrated hole 292 are all formed with a common axial direction A1.

The sealing resin 400 is fully filled in the receiving space 250 thereby wrapping the inner wall of the frame 210, the coil winding set 291 and the first sectional surfaces 261 and the second sectional surfaces 271 of the first rib 260 and the second rib 270.

Therefore, through holding the sectional surfaces 261, 271 of the first rib 260 and the second rib 270, the binding strength of the sealing resin 400 and the inner wall of the frame 210 can be enhanced, thereby allowing the sealing resin 400 to be more tightly combined with the inner wall of the frame 210 and preventing the bobbin 290 from being loosened due to the reciprocal movement of the magnetic way 300.

Accordingly, even if the sealing resin 400 is loosened and released, the sectional surfaces 261, 271 of the first rib 260 and the second rib 270 can also be used for blocking the sealing resin 400 and preventing the bobbin 290 from being linked to reciprocally move by the magnetic way 300.

Figure 2:
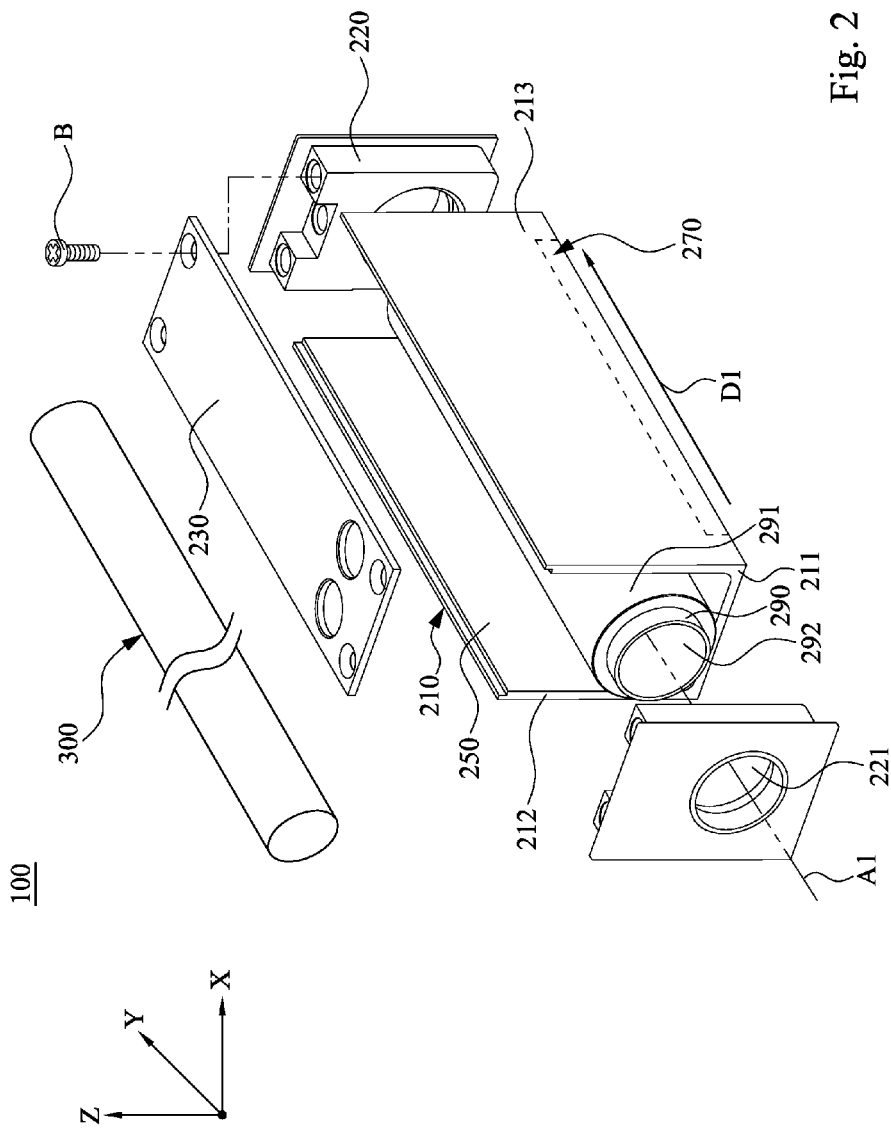
FIG. 2 is an exploded view showing the shaft linear motor according one alternative of this embodiment.

Reference is now made to FIG. 1B and FIG. 2. FIG. 2 is an exploded view showing the shaft linear motor according one alternative of this embodiment.

According to one alternative of this embodiment, the frame 210 includes a first strip-shaped sheet member 211, a second strip-shaped sheet member 212 and a third strip-shaped sheet member 213. The first strip-shaped sheet member 211, the second strip-shaped sheet member 212 and the third strip-shaped sheet member 213 are all extended towards the same long axial direction D1, and the long axial direction D1 is parallel to the axial direction A1 of the frame 210. The third strip-shaped sheet member 213 and the second strip-shaped sheet member 212 are adjacently disposed at two opposite long sides of the first strip-shaped sheet member 211, and both are extended towards a common direction D2, for example, when the first strip-shaped sheet member 211 is horizontally disposed, the third strip-shaped sheet member 213 and the second strip-shaped sheet member 212 are both upwardly extended along the axial direction Z at the two opposite long sides of the first strip-shaped sheet member 211.

As shown in FIG. 1B, the first rib 260 is disposed on the first strip-shaped sheet member 211 and also on the second strip-shaped sheet member 212, i.e., the first rib 260 is disposed at the junction where the first strip-shaped sheet member 211 connects to the second strip-shaped sheet member 212. The second rib 270 is disposed on the first strip-shaped sheet member 211 and also on the third strip-shaped sheet member 213, i.e., the second rib 270 is disposed at the junction where the first strip-shaped sheet member 211 connects to the third strip-shaped sheet member 213.

As shown in FIG. 1B to FIG. 2, according to this embodiment, the armature portion 200 further includes two end covers 220 and an outer cover 230. The two end covers 220 are oppositely covered at two opposite distal ends of the frame 210, for example, the two opposite short sides of the first strip-shaped sheet member 211, the second strip-shaped sheet member 212 and the third strip-shaped sheet member 213 shown in FIG. 2.

Figure 12:
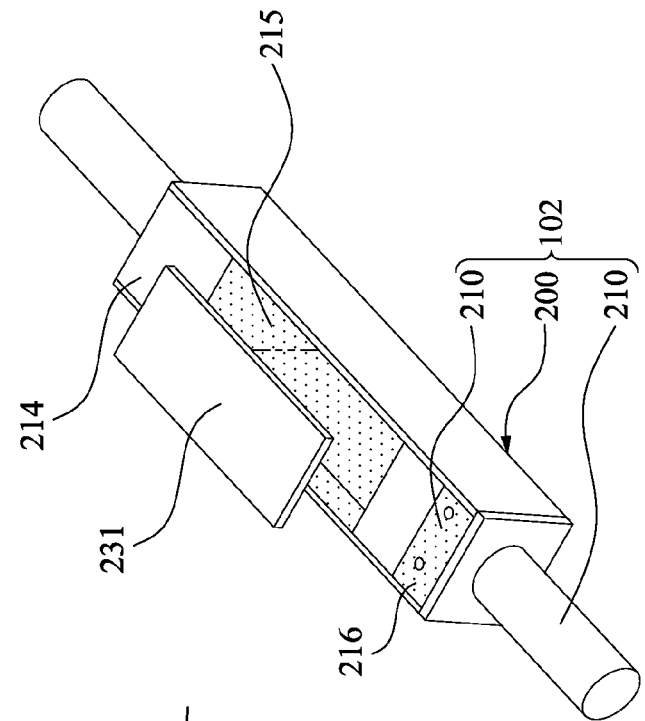
FIG. 12 is an exploded view showing the shaft linear motor according still one another embodiment of the present disclosure.

In addition, each of the end covers 220 is further formed with an opening 221, two ends of the bobbin 290 are respectively received in the openings 221 of the two end covers 220, thereby allowing the bobbin 290 to be disposed in the receiving space 250 of the frame 210 in a suspended manner. The outer cover 230 is covered on the second strip-shaped sheet member 212 and the third strip-shaped sheet member 213, and disposed between the second strip-shaped sheet member 212 and the third strip-shaped sheet member 213. Thus, a bolt B can be used for locking on the two end covers 220 (as shown in FIG. 2), or not locking on the two end covers 220 and only covered between the second strip-shaped sheet member 212 and the third strip-shaped sheet member 213 (as shown in FIG. 12). Each of the end covers 220 is not limited to be made of a metal or non-metal material.

Thus, when the two end covers 220 and the outer cover 230 are assembled with the frame 210 (as shown in FIG. 1A), the first strip-shaped sheet member 211, the second strip-shaped sheet member 212, the third strip-shaped sheet member 213, the outer cover 230 and the two end covers 220 jointly define the receiving space 250.

Figure 3:
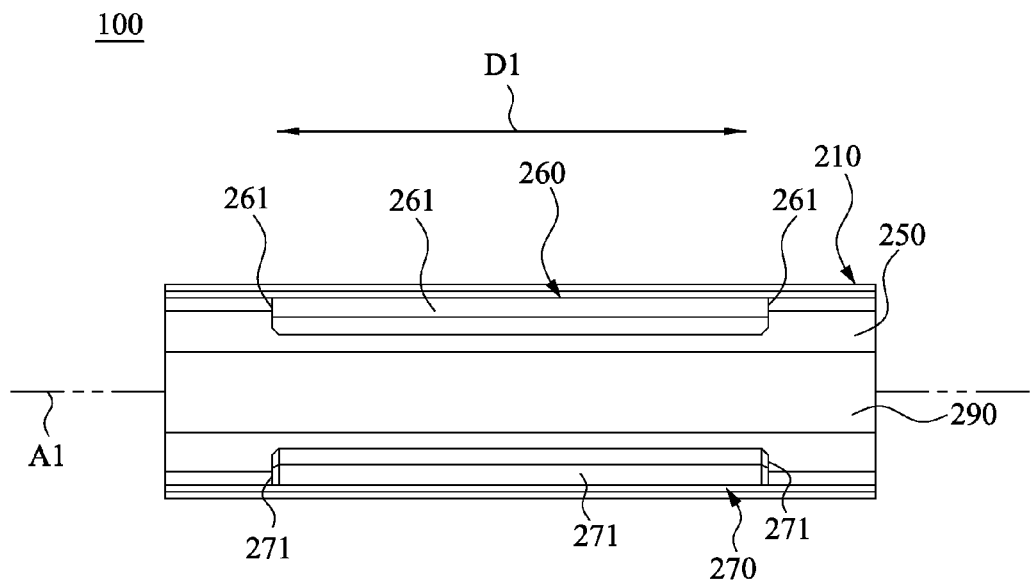
FIG. 3 is a top view showing the frame shown in FIG. 2.

FIG. 3 is a top view showing the frame shown in FIG. 2. As shown in FIG. 3, according to one alternative of this embodiment, when the quantity of the first rib 260 and the quantity of the second rib 270 are both singular, the first rib 260 and the second rib 270 are formed in a columnar shape, and the long axial direction D1 of the first rib 260 and the second rib 270 is parallel to the axial direction A1 of the frame 210. Thus, each side wall of the first rib 260 adjacent to the frame 210 is defined as the first sectional surface 260, each side wall of the second rib 270 adjacent to the frame 210 is defined as the second sectional surface 271.

Figure 4:
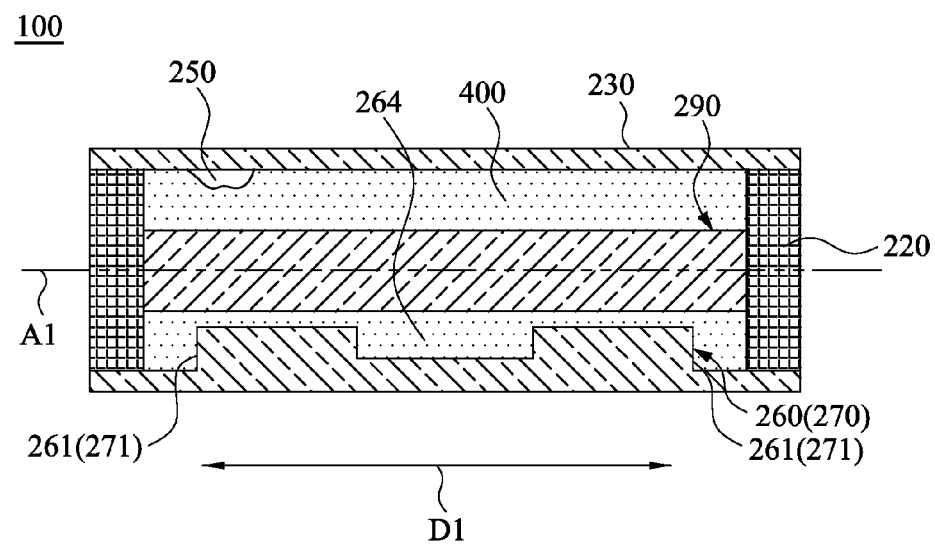
FIG. 4 is a cross sectional view of FIG. 1A taken along line B-B according to one alternative of this embodiment.

Reference is now made to FIG. 4. FIG. 4 is a cross sectional view of FIG. 1A taken along line B-B according to one alternative of this embodiment.

As shown in FIG. 4, according to one alternative of this embodiment, one of the side walls of the first rib 260 (or the second rib 270) is formed with at least one recessed portion 264 thereon, for example, the surface of the first rib 260 (or the second rib 270) opposite to the inner wall of the frame 210 is formed with the recessed portion 264.

Thus, the recessed portion 264 allows the sealing resin 400 to be fully filled therein. The vertical depth of the recessed portion 264 is not greater than a linear distance defined between the inner wall of the frame 210 and the mentioned the side wall having the recessed portion 264.

Besides the sectional surfaces 261, 271 of the first rib 260 and the second rib 270, the inner wall of the recessed portion 264 also allows the sealing resin 400 to be filled and wrapped, thereby also enabling to enhance the binding strength of the sealing resin 400 and the inner wall of the frame 210.

Figure 5:
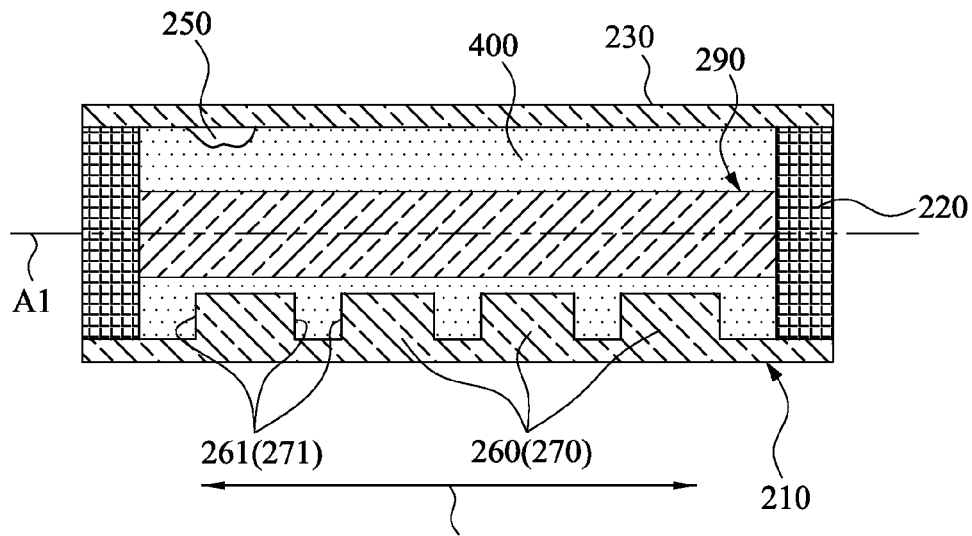
FIG. 5 is a cross sectional view of FIG. 1A taken along line B-B according to another alternative of this embodiment.

FIG. 5 is a cross sectional view of FIG. 1A taken along line B-B according to another alternative of this embodiment. As shown in FIG. 5, according to another alternative of this embodiment, when the quantity of the first rib 260 (or the second rib 270) is plural, the first ribs 260 (or the second ribs 270) are arranged at intervals on the inner wall of the frame 210, the arranging direction of the first ribs 260 (or the second ribs 270) is parallel to the axial direction A1 of the frame 210, and the intervals between the first ribs 260 (or the second ribs 270) are exposed out of the inner wall of the frame 210.

Thus, the plural ribs 260, 270 are able to provide more sectional surfaces 261, 271, and the intervals between the ribs 260, 270 can also be filled and wrapped by the sealing resin 400, thereby also enabled to enhance the binding strength of the sealing resin 400 and the inner wall of the frame 210.

Figure 6:
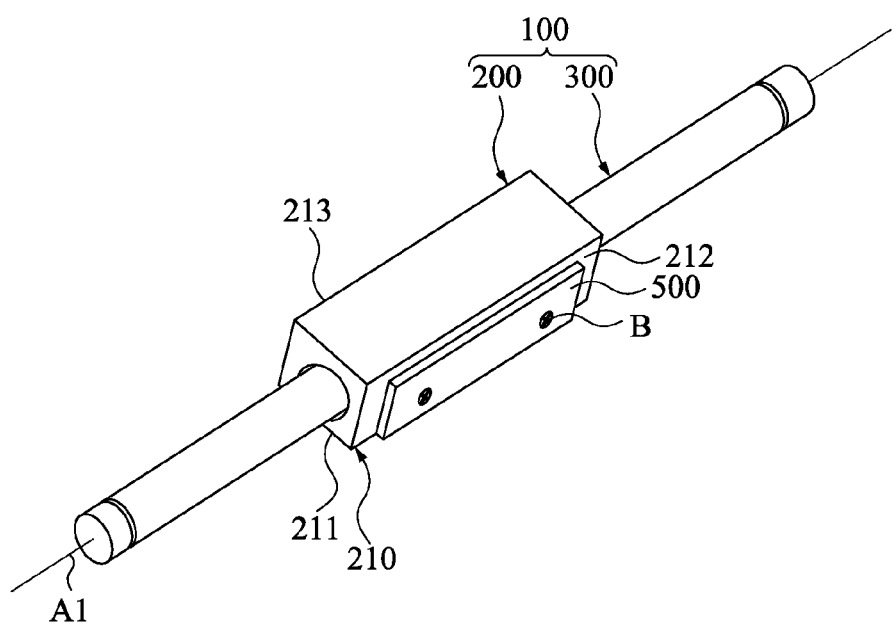
FIG. 6 is an exploded view showing the shaft linear motor according another embodiment of the present disclosure.
Figure 7:
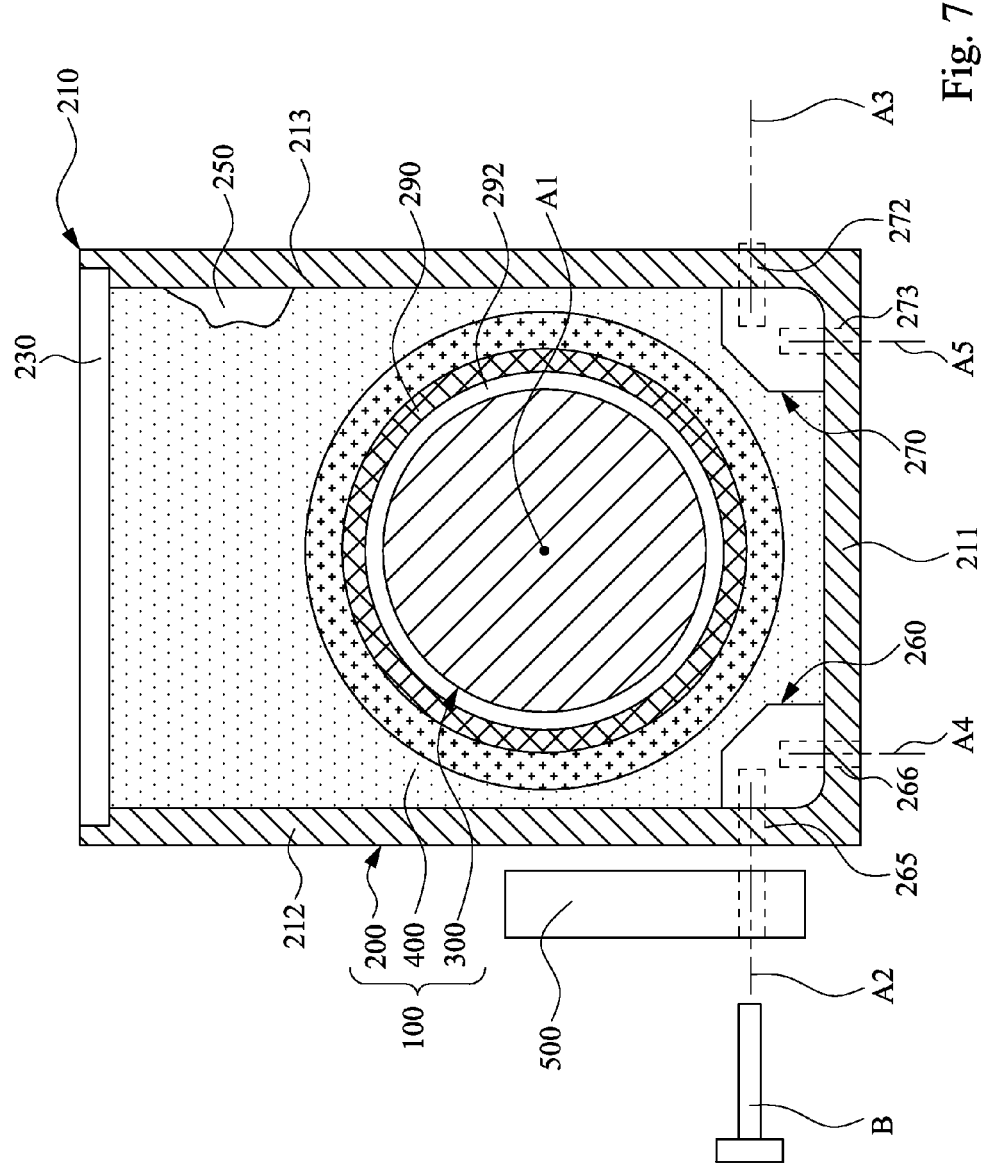
FIG. 7 is a cross sectional view showing the shaft linear motor according the another embodiment of the present disclosure.

Reference is now made to FIG. 6 and FIG. 7. FIG. 6 is an exploded view showing the shaft linear motor according another embodiment of the present disclosure and FIG. 7 is a cross sectional view showing the shaft linear motor according the another embodiment of the present disclosure.

As shown in FIG. 6 and FIG. 7, according to one alternative of this embodiment, the first rib 260 is formed with one or more first screw passages 265. The first screw passage 265 breaks through or is communicated with the outer surface of the second strip-shaped sheet member 212 in the first rib late 260. The axial direction A2 of the first screw passage 265 is perpendicular to the axial direction A1 of the frame 210 or at least staggered with each other.

Accordingly, by utilizing a bolt B to be mutually locked with the first screw passage 265, a first carried object 500 can be fixed on an outer wall of the frame 210 (i.e., the second strip-shaped sheet member 212).

The second rib 270 is formed with one or more second screw passages 272. The second screw passage 272 breaks through or is communicated with the outer surface of the third strip-shaped sheet member 213 in the second rib late 270. The axial direction A3 of the second screw passage 272 is perpendicular to the axial direction A1 of the frame 210 or at least staggered with each other. Therefore, with reference to FIG. 8 which discloses utilizing the bolt B to be mutually locked with the first screw passage 265, the first carried object 500 can also be fixed on an outer wall of the frame 210 (i.e., the third strip-shaped sheet member 213) through utilizing a bolt to be mutually locked with the second screw passage 272.

In addition, according to this alternative, the first rib 260 is further formed with at least one third screw passage 266, the third screw passage 266 breaks through or is communicated with the outer surface of the first strip-shaped sheet member 211 in the first rib 260. The axial direction A4 of the third screw passage 266, the axial direction A2 of the first screw passage 265 and the axial direction A1 of the frame 210 are perpendicular to each other, or at least staggered with each other. The second rib 270 is further formed with at least one fourth screw passage 273, the fourth screw passage 273 is communicated with the outer surface of the first strip-shaped sheet member 211 in the second rib 270. The axial direction A5 of the fourth screw passage 273, the axial direction A3 of the second screw passage 272 and the axial direction A1 of the frame 210 are perpendicular to each other, or at least staggered with each other.

Therefore, with reference to FIG. 7 which discloses through utilizing the bolt B to be mutually locked with the first screw passage 265, the first carried object 500 can also be fixed on an outer wall of the frame 210 (i.e., the first strip-shaped sheet member 211) through utilizing a bolt to be mutually locked with the third screw passage 266 (or the fourth screw passage 273).

The mentioned first carried object 500 is not limited to a certain type, for example, the first carried object 500 can be a heat dissipation unit or a detection unit, thereby allowing the first carried object 500 to be fixed on the outer wall of the frame 210; or, the first carried object 500 can be a fixed carrying member, e.g., a base, thereby allowing the shaft linear motor 100 to be fixed on the fixed carrying member.

Thus, when the thickness of the first rib 260 (or the second rib 270) (i.e., the minimum linear distance defined between the frame 210 to the surface of the first rib 260 opposite to the frame 210) is greater than the thickness of the frame 210 (i.e., the minimum linear distance defined between the outer wall to the inner wall), the screw strength for carrying and installing can be enhanced, and the installing location for other functional components can be increased.

Therefore, the personnel can decide the quantity of the aforementioned screw passages according to the actual needs and limitations, so one or plural first carried objects are enabled to be locked on the outer wall of the first strip-shaped sheet member 211, the second strip-shaped sheet member 212 or the third strip-shaped sheet member 213.

Figure 8:
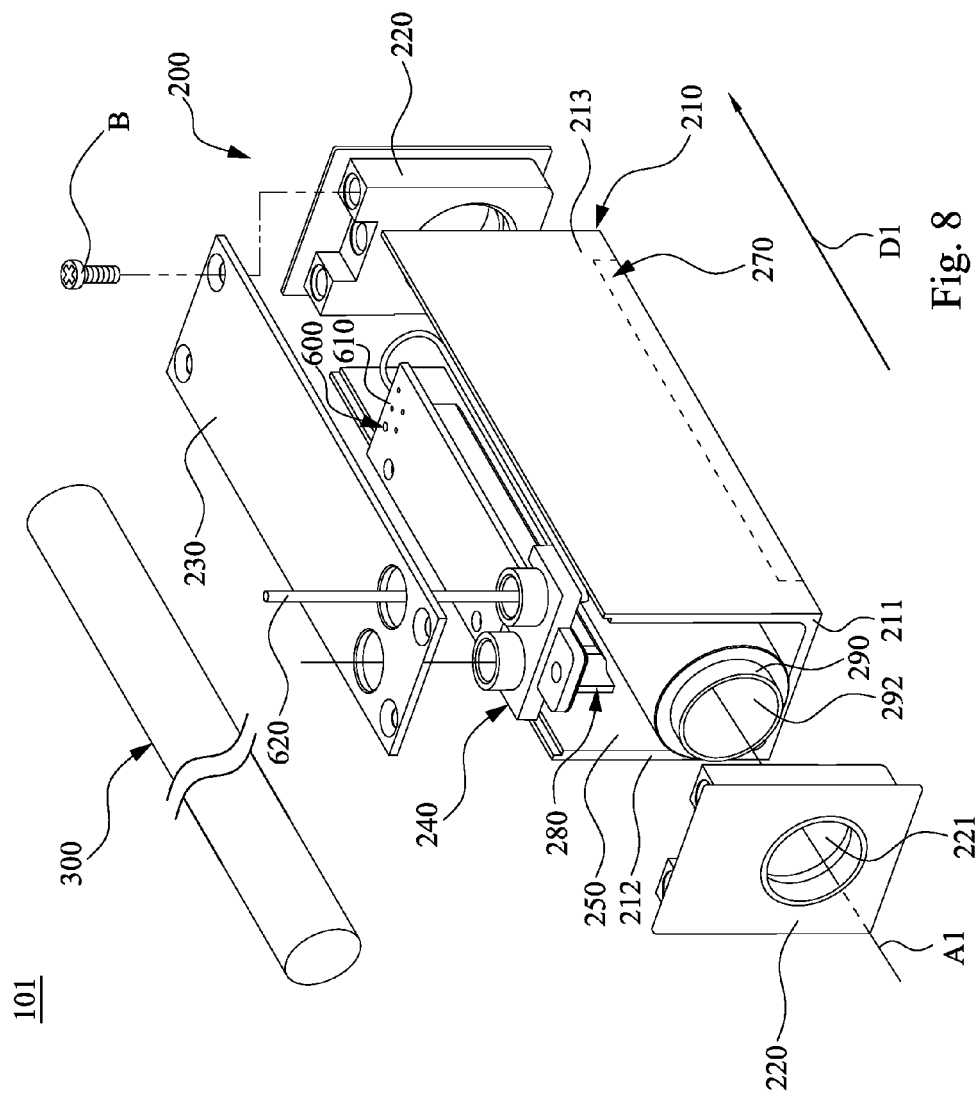
FIG. 8 is an exploded view showing the shaft linear motor according one another embodiment of the present disclosure.

FIG. 8 is an exploded view showing the shaft linear motor according one another embodiment of the present disclosure, and FIG. 9 is a cross sectional view showing the shaft linear motor according the one another embodiment of the present disclosure.

As shown in FIG. 8 and FIG. 9, according to this one another embodiment, the armature portion 200 further includes a third rib 280. The third rib 280 is disposed in the receiving space 250, and arranged on the inner wall of the frame 210 (e.g., the second strip-shaped sheet member 212) and spaced farer from the first strip-shaped sheet member 211 relative to the first rib 260, and the third rib 280 is spaced at an interval with respect to the bobbin 290. In addition, the long axial direction D1 of the third rib 280 is parallel to the axial direction A1 of the frame 210.

The third rib 280 is further formed with plural third sectional surfaces 281. The third sectional surfaces 281 are adjacent to the inner wall of the frame 210 (e.g., the second strip-shaped sheet member 212). Thus, the sealing resin 400 can wrap the third sectional surfaces 281 of the third rib 280.

Thus, through the sectional surfaces 261, 271, 281 of the first rib 260, the second rib 270 and the third rib 280, the binding strength of the sealing resin 400 binding to the inner wall of the frame 210 can be further enhanced.

According to one alternative of this embodiment and with reference to FIG. 3, same as the first rib 260 and the second rib 270, the quantity of the third rib 280 can be singular and the shape thereof can be formed in a columnar shape. Thus, the side wall of the third rib 280 adjacent to the frame 210 can be defined as the third sectional surface 281.

According to one alternative of this embodiment and with reference to FIG. 4, same as the first rib 260 and the second rib 270, the third rib 280 can be formed with a recessed portion 264 thereby allowing the sealing resin 400 to be fully filled in the recessed portion 264.

According to one alternative of this embodiment and with reference to FIG. 5, same as the first rib 260 and the second rib 270, the quantity of the third rib 280 can be plural, and the third ribs 280 are arranged at intervals. Thus, the plural third ribs 280 can provide more third sectional surfaces 281 in quantity, the intervals between the third ribs 280 allow the sealing resin 400 to be filled in for wrapping, thereby enhancing the binding strength of the sealing resin 400 and the inner wall of the frame 210.

According to the disclosed alternatives, the first rib 260, the second rib 270 and the third rib 280 can be integrally formed on the inner wall of the frame 210, or be individually formed then fixed on the inner wall of the frame 210. In addition, the first sectional surfaces 261 (or the second sectional surfaces 271 or the third sectional surfaces 281) of the first rib 260 (or the second rib 270 or the third rib 280) are not limited to be vertically connected to the inner wall of the frame 210, or at least close to be vertical to the inner wall of the frame 210, or, the first sectional surfaces 261 (or the second sectional surfaces 271 or the third sectional surfaces 281) of the first rib 260 (or the second rib 270 or the third rib 280) can be gradually inclined towards the center of the first rib 260 (or the second rib 270 or the third rib 280) and the direction of the frame 210, thereby being able to generate the fastening effect with more of the sealing resin 400. Moreover, the first rib 260, the second rib 270 and the third rib 280 are not limited to be formed as solid or hollow. Furthermore, the first strip-shaped sheet member 211, the second strip-shaped sheet member 212 and the third strip-shaped sheet member 213 are not limited to be integrally formed, and not limited to be made of a metal or non-metal material.

FIG. 10 is a cross sectional view showing the shaft linear motor according to one alternative of the one another embodiment, wherein the crossing location being the same as FIG. 9.

According to the one another embodiment, the third rib 280 is further formed with one or more fifth screw passages 282. The fifth screw passage 282 is communicated with the outer surface of the second strip-shaped sheet member 212 in the third rib 280. The axial direction A6 of the fifth screw passage 282 and the axial direction A1 of the frame 210 are perpendicular to each other, or at least staggered with each other. Thus, through utilizing a bolt B to be mutually locked with the fifth screw passage 282, the first carried object 500 can be fixed on an outer wall of the frame 210 (i.e., the second strip-shaped sheet member 212) and close to the outer cover 230.

The mentioned first carried object 500 is not limited to a certain type, for example, the first carried object 500 can be a heat dissipation unit or a detection unit, and disposed on the outer wall of the frame 210; or, the first carried object 500 can be a fixed carrying member, e.g., a base, thereby allowing the shaft linear motor 100 to be fixed on the fixed carrying member.

When the thickness of the third rib 280 (i.e., the minimum linear distance defined between the frame 210 to the surface of the third rib 280 opposite to the frame 210) is greater than the thickness of the frame 210 (i.e., the minimum linear distance defined between the outer wall to the inner wall), the screw strength for carrying and installing can be enhanced, and the installing location for other functional components can be increased.

Thus, when the shaft linear motor 100 is fixed on the fixed carrying member in a more stable manner, or when a heat dissipation unit with higher performance is installed on the shaft linear motor 100, the shaft linear motor 100 is enabled to be provided with components having higher performance, and the sealing resin 400 is prevented from being easily released from the inner wall of the frame 210.

What shall be addressed is that the personnel can lock one or more first carried objects 500 on the outer wall of the first strip-shaped sheet member 211, the second strip-shaped sheet member 212 or the third strip-shaped sheet member 213 according to the actual needs and limitations.

Referring from FIG. 8 to FIG. 10, according to one alternative of this embodiment, the third rib 280 is further formed with one or more sixth screw passages 283. The sixth screw passage 283 is formed on the third sectional surface 281 of the third rib 280 opposite to the first strip-shaped sheet member 211, and the axial direction A7 of the sixth screw passage 283 and the axial direction A6 of the fifth screw passage 282 and the axial direction A1 of the frame 210 are perpendicular to each other, or at least staggered with each other.

Thus, through utilizing a bolt B to be mutually locked with the sixth screw passage 283, a second carried object 600 can be locked on the third sectional surface 281 of the third rib 280. The second carried object 600 is not limited to a certain type, and can be e.g., a grounding wire or a circuit board.

As shown in FIG. 8, when the second carried object 600 is a circuit board 610, the circuit board 610 is disposed in the receiving space 250, and wrapped by the sealing resin 400. Because the circuit board 610 is installed with components such as a temperature or magnetic detector, while the shaft linear motor 100 is reciprocally moving, the circuit board 610 is able to detect relevant data in a more timely and precise manner comparing to the detection unit installed on the shaft linear motor 100, and the circuit board 610 is installed with a wire 620 for the purpose of transmitting.

According to this embodiment and with reference to FIG. 8, the armature portion 200 further includes a wiring bracket 240. The wiring bracket 240 is disposed in the receiving space 250, and fixed on the outer cover 230 and the end cover 220, and used for guiding the layout of the wire 620.

As shown in FIG. 10, a wire layout zone 251 is substantially defined between the third rib 280 to the third strip-shaped sheet member 213, beside the sealing resin 400, the wire layout zone 251 is not provided with any solid component thereby providing a space for wire layout. Thus, the wire 620 is enabled to be extended from the circuit board 610 to the wiring bracket 240 through the wire layout zone 251, and further extended to the exterior from the wiring bracket 240.

Figure 11:
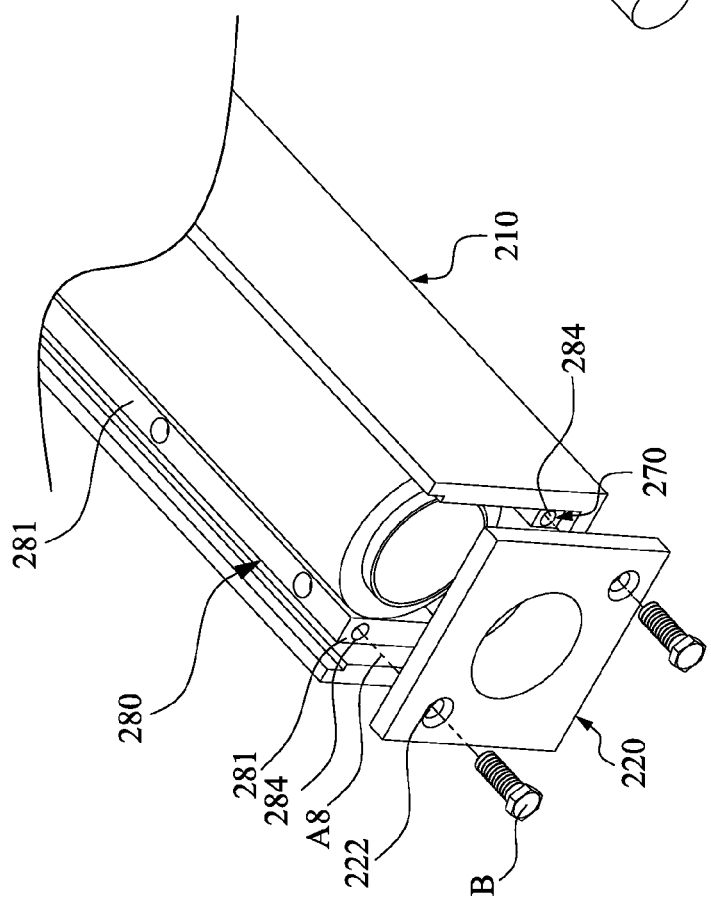
FIG. 11 is a partially exploded view showing the shaft linear motor and the end cover according to the present disclosure.

As shown in FIG. 10 and FIG. 11, according to one alternative of this embodiment, the two end covers 220 can be further locked on a combination consisted of the first rib 260, the second rib 270 and the third rib 280.

For example, when at least one of the first sectional surfaces 261, the second sectional surfaces 271 and the third section surfaces 281 facing the same end cover 220 is formed with a seventh screw passage 284. The axial direction A8 of the seventh screw passage 284 is parallel to the axial direction A1 of the frame 210. The end cover 220 is formed with an eighth screw passage 222. The eighth screw passage 222 penetrates the end cover 220, and the eighth screw passage 222 is aligned with the seventh screw passage 284.

Thus, by utilizing a bolt B to pass the eighth screw passage 222 and the seventh screw passage 284, the end cover 220 can be fixed on the frame 210. The eighth screw passage 222 is e.g., a counter sink thereby allowing the end cover 220 and the frame 210 to be combined more tightly. However, the present disclosure is not limited to the disclosed arrangement, when the eighth screw passage is not designed as the counter sink, the production process of the armature portion 200 can be simplified.

Reference is now made to FIG. 12. FIG. 12 is an exploded view showing the shaft linear motor according still one another embodiment of the present disclosure.

According to one alternative of this embodiment, beside the first strip-shaped sheet member 211, the second strip-shaped sheet member 212 and the third strip-shaped sheet member 213, the frame 210 further includes a fourth strip-shaped sheet member 214. The fourth strip-shaped sheet member 214 is connected between the second strip-shaped sheet member 212 and the third strip-shaped sheet member 213, and formed with a first notch 215 and a second notch 216. The first notch 215 and the second notch 216 are both communicated with the receiving space 250, and the outer cover 231 is covered on the first notch 215, the sealing resin 400 is provided for sealing the second notch 216 and exposed via the second notch 216.

Based on what has been disclosed above, with the ribs installed in the frame of the shaft linear motor provided by the present disclosure, the binding strength of the sealing resin binding to the inner wall of the frame of the armature portion can be enhanced, thereby lowering the possibility of the sealing resin being released from the inner wall of the frame of the armature; moreover, the ribs can be formed with more screw passages thereby allowing the shaft linear motor to be provided with more functional components, or be fixed on a fixed carrying member in a much more stable manner thereby allowing to be installed with components having higher performance and the sealing resin to be prevented from being easily released from the inner wall of the frame of the armature portion.

One major advantage achieved by the shaft linear motor of the present disclosure is that the disadvantage of prior art can be effectively solved under the situation of not increasing the dimension of the armature portion and not requiring any specific mechanical processing and not affecting the wiring space, and the present disclosure also provides various options for applications.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A shaft linear motor comprising:
   an armature portion comprising:
     a frame formed with two sidewalls and a receiving space defined between the two sidewalls;
     at least one first rib and at least one second rib, disposed in the receiving space, and arranged on an inner wall of the frame, the first rib comprising at least one first sectional surface, the second rib comprising at least one second sectional surface, wherein the first sectional surface and the second sectional surface are respectively adjacent to the inner wall of the frame, the first rib is formed with at least one first screw passage communicated with an outer surface of one of the two sidewalls of the frame, and the second rib is formed with at least one second screw passage communicated with an outer surface of the other of the two sidewalls of the frame; and
     a bobbin disposed in the receiving space, being reeled with a coil winding set on an outer wall of the bobbin, and spaced with an interval with respect to the first rib and the second rib, the bobbin being formed with an axially penetrated hole;
   a magnetic way linearly and moveably disposed in the axially penetrated hole of the bobbin; and
   a sealing resin fully filled in the receiving space for wrapping the inner wall of the frame, the coil winding set and the first sectional surface and the second sectional surface.

2. The shaft linear motor according to claim 1, wherein the frame is formed in a columnar shape, and the receiving space, the first rib and the second rib and the axially penetrated hole each extend in an axial direction of the frame.

3. The shaft linear motor according to claim 2, wherein the frame comprises:
   a first strip-shaped sheet member having a long axial direction being parallel to the axial direction of the frame;
   a second strip-shaped sheet member having a long axial direction being parallel to the axial direction of the frame, wherein the second strip-shaped sheet member is one of the two sidewalls of the frame; and
   a third strip-shaped sheet member having a long axial direction being parallel to the axial direction of the frame, the third strip-shaped sheet member and the second strip-shaped sheet member are disposed adjacent to two opposite long sides of the first strip-shaped sheet member and extended towards the same direction, wherein the third strip-shaped sheet member is the other of the two sidewalls of the frame, the first rib is disposed at a junction wherein the first strip-shaped sheet member connects to the second strip-shaped sheet member, and the second rib is disposed at another junction where the first strip-shaped sheet member connects to the third strip-shaped sheet member.

4. The shaft linear motor according to claim 3, wherein the armature portion further comprises:
   two end covers oppositely covered on two opposite short sides of the first strip-shaped sheet member, the second strip-shaped sheet member and the third strip-shaped sheet member, each of the end covers is formed with an opening, wherein two ends of the bobbin are respectively received in the openings of the two end covers; and
   an outer cover covered between the second strip-shaped sheet member and the third strip-shaped sheet member, wherein the receiving space is jointly defined by the first strip-shaped sheet member, the second strip-shaped sheet member, the third strip-shaped sheet member, the outer cover and the two end covers.

5. The shaft linear motor according to claim 4, wherein the first rib and the second rib are formed in a columnar shape, respectively formed with at least one recessed portion thereon, wherein the sealing resin is fully filled in the recessed portions.

6. The shaft linear motor according to claim 4, wherein the first rib is formed with at least one third screw passage, the second rib is formed with at least one fourth screw passage, the third screw passage and the fourth screw passage are both communicated with the outer surface of the first strip-shaped sheet member.

7. The shaft linear motor according to claim 6, wherein the armature portion further comprises:
   a third rib disposed in the receiving space, and arranged on one surface of the second strip-shaped sheet member and spaced away from the side where the first strip-shaped sheet member being arranged, the third rib is extended towards the axial direction of the frame, and the third rib comprises a plurality of third sectional surfaces, the third sectional surfaces are adjacent to the surface of the second strip-shaped sheet member, wherein the sealing resin further wraps the third sectional surfaces.

8. The shaft linear motor according to claim 7, wherein the third rib is formed in a columnar shape, and formed with at least one recessed portion, wherein the sealing resin is fully filled in the recessed portion.

9. The shaft linear motor according to claim 7, wherein the at least one third rib is formed with at least one fifth screw passage, the at least one fifth screw passage is communicated with the outer surface of the second strip-shaped sheet member.

10. The shaft linear motor according to claim 7, wherein the third rib is formed with at least one sixth screw passage, the sixth screw passage is formed on the third sectional surface of the third rib opposite to the first strip-shaped sheet member, and the axial direction of the sixth screw passage is staggered with the axial direction of the frame.

11. The shaft linear motor according to claim 10, further comprising:
   a second carried object, wherein a bolt is utilized for being mutually locked with the sixth screw passage, so the second carried object is capable of being fixed on the third rib.

12. The shaft linear motor according to claim 7, wherein at least one of the first sectional surfaces, the second sectional surfaces and the third section surfaces facing the same end cover is formed with a seventh screw passage; and
   the end cover is formed with an eighth screw passage,
   wherein a bolt is utilized to pass the eighth screw passage and the seventh screw passage, so the end cover is capable of being fixed on the frame.

13. The shaft linear motor according to claim 6, further comprising:
   a first carried object, wherein a bolt is utilized for being mutually locked with at least one of the first screw passage to the fourth screw passage, so the first carried object is capable of being fixed on an outer wall of the frame.

14. The shaft linear motor according to claim 4, wherein the armature portion further comprises:
   a wiring bracket disposed in the receiving space, fixed on the outer cover and one of the end covers, for guiding the layout of wires.

15. The shaft linear motor according to claim 4, wherein the frame further comprises:
   a fourth strip-shaped sheet member, connected to the second strip-shaped sheet member and the third strip-shaped sheet member therebetween, and formed with a first notch thereon, the outer cover is covered on the first notch.

* * * * *